US008619244B2

(12) United States Patent
Hecker et al.

(10) Patent No.: US 8,619,244 B2
(45) Date of Patent: Dec. 31, 2013

(54) METHOD OF CHECKING THE AUTHENTICITY OF A DOCUMENT WITH A CO-LAMINATED FABRIC LAYER INSIDE

(75) Inventors: Hermann Hecker, Berlin (DE); Andreas Griesbach, Erfurt (DE)

(73) Assignee: HID Global GmbH (DE)

( * ) Notice: Subject to any disclaimer, the term of this patent is extended or adjusted under 35 U.S.C. 154(b) by 418 days.

(21) Appl. No.: 12/936,662

(22) PCT Filed: Apr. 6, 2009

(86) PCT No.: PCT/EP2009/054063
§ 371 (c)(1), (2), (4) Date: Dec. 28, 2010

(87) PCT Pub. No.: WO2009/124898
PCT Pub. Date: Oct. 15, 2009

(65) Prior Publication Data
US 2011/0089676 A1 Apr. 21, 2011

(30) Foreign Application Priority Data
Apr. 11, 2008 (EP) .................................... 08154413

(51) Int. Cl.
*G06K 9/74* (2006.01)

(52) U.S. Cl.
USPC ........................................................ 356/71

(58) Field of Classification Search
None
See application file for complete search history.

(56) References Cited

U.S. PATENT DOCUMENTS 4,407,525 A 10/1983 Hoppe
5,104,471 A * 4/1992 Antes et al. .................. 156/233

FOREIGN PATENT DOCUMENTS

EP 0253089 A 1/1988
EP 0388090 A 9/1990
WO WO 96/36010 A 11/1996

OTHER PUBLICATIONS

Translation of EP 0253089 A, downloaded Jan. 29, 2013, Europe Patent Office Website (www.epo.org).*
International Search Report prepared by the European Patent Office on Aug. 5, 2009, for International Application No. PCT/EP2009/054063.
Written Opinion prepared by the European Patent Office on Aug. 5, 2009, for International Application No. PCT/EP2009/054063.

* cited by examiner

*Primary Examiner* — Gregory J Toatley
*Assistant Examiner* — Amanda Merlino
(74) *Attorney, Agent, or Firm* — Sheridan Ross P.C.

(57) ABSTRACT

A method to test the authenticity of a document (1), such as an ID, a passport or a card, protected against forgery, wherein it comprises at least an inner co-laminated fabric layer (2) forming an optical watermark. This layer presents cuts, and so separated zones with fabric material and other zones without fabric material, forming well recognizable forms or pictures. Co-laminating one or a plurality of such fabric layers inside of the document body allows to create a multiple watermark having both surface relief and opacity effect, without adding any volume to the body of the document.

16 Claims, 3 Drawing Sheets

Figure 1

METHOD OF CHECKING THE AUTHENTICITY OF A DOCUMENT WITH A CO-LAMINATED FABRIC LAYER INSIDE

CROSS REFERENCE TO RELATED APPLICATIONS

This application is a national stage application under 35 U.S.C. 371 of PCT Application No. PCT/EP2009/054063 having an international filing date of 6 Apr. 2009, which designated the United States, which PCT application claimed the benefit of European Patent Application No. 08154413.2 filed 11 Apr. 2008, the entire disclosure of which is incorporated herein by reference.

TECHNICAL FIELD

The present invention concerns a method for checking the authenticity security documents, for example passports, ID and other similar security documents. It also relates to the document itself, which contains a co-laminated fabric layer forming a watermark to be checked.

BACKGROUND ART

It is known in the art to provide security documents, such as for example ID, passports and other similar documents with different security features. A well known security feature is the watermark that is created during the creation of a paper substrate by specific process and that is embedded in the paper.

The main characteristics of a watermark on the level of security can be seen as the following: it can be a protection of the paper being fabricated to avoid a non-authorised reproduction (typically such as forgery), it is a safety feature being made by a technique that is not easily available, it is usually created by a specific tool, it can be controlled without specific means (for example visually), it has the possibility of a creation with multiple levels resulting in multiple grey tones.

These features have the consequence that the watermark is seen as a high value security feature that is used in nearly all the paper based documents that have to be protected against forgery, such as ID, passports and other similar documents.

In the past years, the request for documents with security elements or features has increased in particular in view of their long life, many paper based documents have been replaced by documents made of a synthetic material or of a combination of synthetic materials. Such documents are able to fulfil the need of a 10 years lifespan but comprise no watermarks since such an element is difficult to be created in a synthetic material.

Tests have been made to modulate the opacity of a document by cutting out a window in an intermediate or core layer of said document. However, such cuts have brought collapse regions in the surface and also uneven wear at the location of the cut. For these reasons these tests were unsuccessful.

It is also well known of the art to create a surface watermark by changing the surface relief or the surface texture. On synthetic documents, this is achieved by using a (hot) stamp or an impression plate (can also be achieved during batch lamination). Both have their drawback, mainly related to pricing, yield and control of the final quality of the surface.

SUMMARY OF THE INVENTION

It is therefore an aim of the present invention to improve the known security elements for documents that have to be protected.

It is a further aim of the present invention to provide a method to check the authenticity of a document, for example a synthetic document, protected against forgery.

One of the ideas of the present invention comprises the use of an extremely thin fabric layer embedded in a laminated structure of a product, such as a card, as a security feature against forgery. The fabric layer presents cuts, and so that separated zones with fabric material and other zones without fabric material, form well recognizable shapes or pictures.

As can be understood from the present specification, the notion of fabric layer should be understood as broadly meaning all kind of woven fabrics (textile) or non woven fabric materials. A preferable type of material used will be a non-woven fabric, which should be understood as sheet or web structures bonded together by entangling (long and natural) fibres or filaments mechanically, thermally or chemically, and generally showing an extreme high porosity.

Independent of the material chosen, the porosity of the fabric layer should be sufficiently high that it is fully impregnated/penetrated by the synthetic material of the proximate layers during the lamination. An advantage is that once fully embedded in the laminated body, it adds almost no volume and/or thickness to the final body size of the document.

But the most interesting effects of the embedded fabric layer in the perspective of the invention are the following:

- The presence of such a fabric layer in the laminated structure has the effect of creating a microscopic variation at the surface of the document, at the vertical of zones with fabric material, thus creating an art of reflective watermark.
- By introducing the fabric layer in the laminated body, one changes the opacity characteristics of the document. By making openings and differentiated zones in the fabric layer, one creates a transmission watermark in the structure of the document.

The co-laminating of fabric layers allows to create a multiple watermark having both surface relief and opacity effect, without adding any volume to the body of the document.

The invention also relates to a method of authentication of a document comprising a security feature or watermark as described above. The method comprises the steps of illuminating different spots on a surface (or even on both surfaces) of the document, then detecting the light emitted by each said spots, and finally determining if each spot at the surface is located at the vertical of a zone with or without fabric material inside the document. This method is based on the effects described above whereby the presence of non-woven material inside the document's body modifies both opacity and surface relief of the local surface area (spot) situated directly above. Incident light on such surface areas will also be reflected, transmitted, scattered and/or absorbed in a different way than on surface area situated just above a zone of the fabric layer without fabric material.

Many different tests of authenticity can be made. One can test only a discrete number of spots at the document surface, verifying their exact or relative positions (looking at the same geometrical distribution). One can scan the entire document surface, or at least a part of the surface, under which it is expected that the fabric material forms a determined picture or image. If the document is authentic and the resolution of illuminated spots is high enough, the figure or picture formed by the recollection of the type of zone of all spot will match exactly the predefined figure or picture of the fabric layer. One can also use a light source which uniformly illuminates the surface of the document, for example the sun. A human observer would be then able to recognize (differentiate) the figure (pattern, picture) formed by the light reflected/reemitted by the illuminated surface, or the light transmitted through the opposite surface of the document.

A further embodiment will be to combine several optical tests, for example by testing the different patterns obtain in both reflection and transmission modes.

In a specific embodiment, several fabric layers are co-laminated, at different depths, inside the document. Each fabric layer can show a different distribution of the zones with and without fabric material. The local opacity and surface relief of the document depends then of a subtle interplay of the different distributions in each fabric layer. This is to be compared with a multiple step or "semi-3D" watermark.

DETAILED DESCRIPTION OF THE INVENTION

The invention will be better understood with the following description together with the drawings in which.

Figure 1:
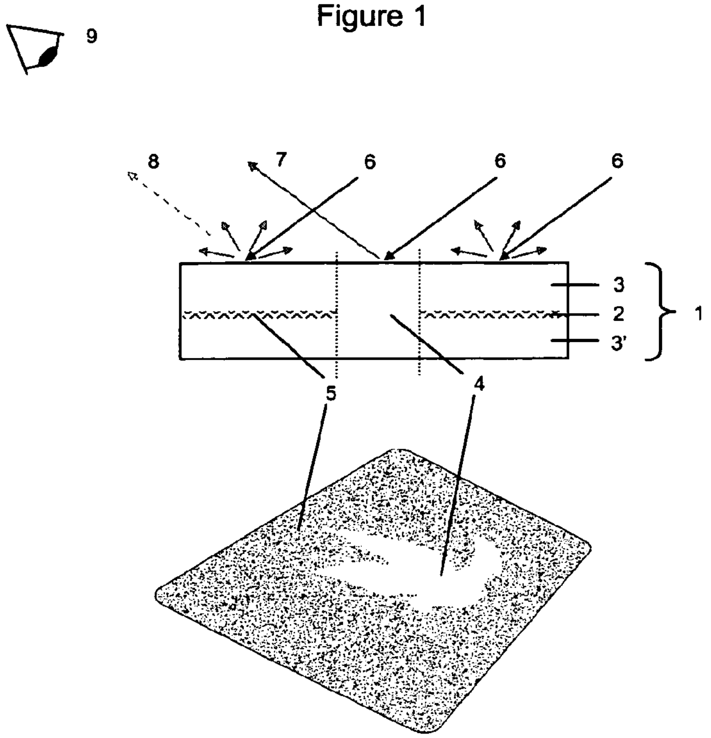
FIG. 1 illustrates a first embodiment of the invention with a test of authenticity of a document in reflection mode.
Figure 4:
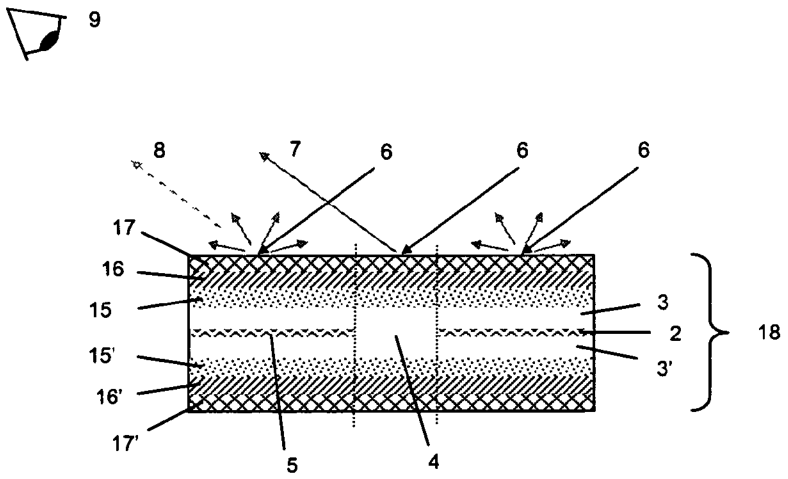
Figure 5:
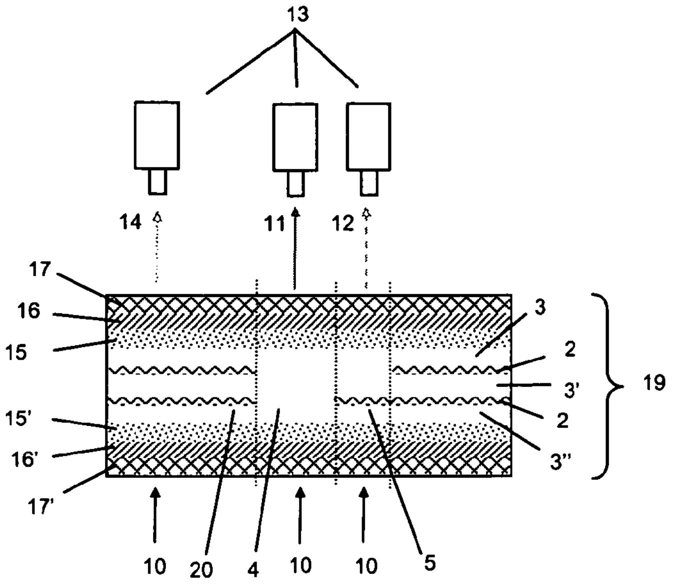

FIG. 4 illustrates a third embodiment of the invention with a test of authenticity of a document in reflection mode FIG. 5 illustrates a fourth embodiment of the invention with a test of authenticity of a document containing a plurality of fabric layers FIG. 1 shows a first embodiment of the invention, illustrating the method of checking the authenticity of the document 1 in reflection mode. The document 1, for example a card, is made of a laminated structure and it comprises a thin fabric layer 2. This layer 2 may be cut in order to comprise an opening 4. The fabric layer 2 has been co-laminated with synthetic material layers 3 and 3' on both sides, thus fully embedding the layer 2 in the synthetic material, which also impregnates (fully penetrates) the porous fabric layer 2.

As can be understood from the present specification, the notion of fabric layer should be interpreted as broadly meaning all kind of woven fabrics (textile) or non woven fabric materials. A preferable type of material used will be a non-woven fabric, which should be understood as sheet or web structures bonded together by entangling (long and natural) fibres or filaments mechanically, thermally or chemically, and generally showing an extreme high porosity.

An advantage of such a fabric layer 2 is its extreme porosity. When it is fully (impregnated) embedded in the laminated body, it adds almost no volume to the final body. Additionally, the layer 2 cannot then be distinguished and separated from the rest of the material forming the body 1. In order to fulfil these characteristics, the fabric layer has preferably a thickness of less than 50 micrometers.

Preferably, the fabric layer is made of a natural or synthetic fibre material with a fusing temperature that is higher than 180° C. (at least higher than the fusing temperature of the surrounding synthetic material).

In an embodiment using non-woven material, the fibres have a diameter of less than 25 micrometer. Also, the fibre length should preferably be approximately 2 to 10 mm. Of course, these values are only illustrative and may be varied according to circumstances.

The layer colour could also be natural so that after the lamination the fibres are nearly invisible (but resulting in a macroscopic milky opacity). This kind of material is used to manufacture tea bags for example. Of course, other equivalent materials maybe envisaged for the same purpose. Preferably, such substrates are waterproof and even boil-proof. This means that the fibres and the bonds are not sensitive to water, even boiling water, or heat.

Typical material used for non-woven layer 2 include a foil with a grammage of less than 25 g/m$^2$. This limit corresponds to that for silk paper definition. Preferably one uses a non-woven layer with a grammage of less than 20 g/m$^2$ and preferably with less than 10 g/m$^2$. Of course, these are illustrative values that should not be considered as a limitation in the scope of the present invention.

Possible thermoplastic materials for the layers 3 and 3' are for example polyethylene terephthalate glycol (PET-G) or polyurethane (PU; for ex. Walopur 4201 AU of Epurex) or polycarbonate (PC), for ex. Makrofol of Bayer. Other equivalent materials might of course be envisaged in the frame of the present invention. Examples for lamination parameters for PU as thermoplastic material are 140-205° C. and 20-60 N/cm$^2$ in the heating circle.

The layers 3 and 3' can also be made from two different thermoplastics, e. g. polyurethane (PU) and polycarbonate (PC) or polyurethane (PU) and polyvinylchloride (PVC), where at least one of the layers melts during lamination in such a way that the fabric layer is fully penetrated by the molten thermoplastic.

It is also possible to form at least one of the layers 3 and 3' from PET, which is coated with an adhesive, e. g. PVA, where the adhesive fully penetrates the fabric layer.

In another embodiment the layers 3 and 3' can be made from several layers, as it will be described later according FIGS. 4 and 5.

It has to be noted that after the lamination, the non-woven layer 2 as such could be almost no longer detectable inside the laminated structure. In the case illustrated in FIG. 1, the "evanescent" network of non-woven fibers is completely embedded in the thermoplastic material and the continuation of its structure is very difficult to distinguish. As a result, the non-woven fibers significantly reinforce the smooth thermoplastic material. The lamination thus generated is able to absorb stresses and shearing forces. It is resistant to plastic deformation and goes back to its initial form after being bent for example. One important additional effect of this structure is that the shrinking factor of the filling material after the lamination will almost disappear, due to the effect of the non-woven foils. As there is no shrinking of the substrate during lamination, the temperature can be very high. This prevents yield loss caused by mechanical stress at room temperature. This also prevents curling or other deformations of the document geometry.

Another important characteristic of such non-woven material is that it is waterproof (due to the lack of hydrogen bond). It can be put into water, and is even stable when boiled or ironed. The kind of material used is typically used to manufacture tea bags, filters, or cleaning paper for lenses for example. It can also be defined as a non-woven fabric layer or non-woven gauze layer.

The non-woven layer 2 can be made for example of the material named "Dynatec 8.5/LCM" of Papierfabrik Schoeller & Hoesch GmbH & Co. This shows a grammage of 8.5 g/m$^2$ and a thickness (calliper) of 35 micrometers. It is made of fibres with a diameter of less than 25 micrometers.

The arrangement of FIG. 1 has been submitted to a lamination process. As the fabric layer 2 is very thin and porous, the synthetic material of layers 3 and 3' can easily penetrate, making the lamination much easier.

By adding opening(s) 4 in the fabric layer 2, one creates areas at the surface of document 1 that will have a different optical characteristic. This is illustrated in FIG. 1 by the impinging light rays 6 and their reflections in different directions. The zone 5 of the fabric layer 2 comprises fabric material, which induces a microscopic variation at the surface of the document situated at the vertical of zone 5. This microscopic change is the surface relief is in particular observable through the induced changes in the local optical characteristic (as reflection, scattering, absorption or transmission for example) of the surface. The zone 4 of the fabric layer comprises no fabric material. This could be obtained by a cut of the fabric layer 2, or any other possible means (for example a surface portion of document wherein the fabric layer does not extend). Due to the absence of fabric material in zone 4, no change of the surface relief can be observed on the surface of the document situated at the vertical of the zone 4. It is however possible to distinguish between zones 5 type and zones 4 type.

In order to achieve the effect according to the invention, the fabric layer should preferably be positioned between 50 and 500 micrometers below the surface of the document. If the fabric layer is too far away from the surface of the document no change in the surface relief can be observed. It is also possible that an embedded fabric layer creates changes of the surface relief at one/front face of the document, but lets at the same time the opposite/rear face (being further of the fabric layer) unchanged.

FIG. 1 illustrates the method of checking the authenticity of the document 1 in reflection mode by a human observer 9. The source of impinging light rays 6 is a light source, like for example the sun, which illuminates uniformly one surface of the document 1. The human observer 9 is observing the illuminated surface and is able to perceive a part of the reflected rays emitted rays (as 7 and 8) emitted by the surface. Due to the different surface states between zones of type 4 or 5 (without or with fabric material at the level of the fabric layer), it is possible for a human eye to differentiate between the different zones. If needed the observer will have to change the orientation of the surface of the document with regards of the direction of the light source and/or to change his point of observation of the surface. Under proper conditions, the human observer 9 will be able to distinguish a shape (pattern, picture, image). The human visual control of the authenticity of the document is positive if the perceived shape matches the one that should be expected according the predefined form of the fabric layer 2. This is illustrated by the lower image part of FIG. 1. Of course, the human observer 9 should be trained in order be able to achieve a valid control.

Figure 2:
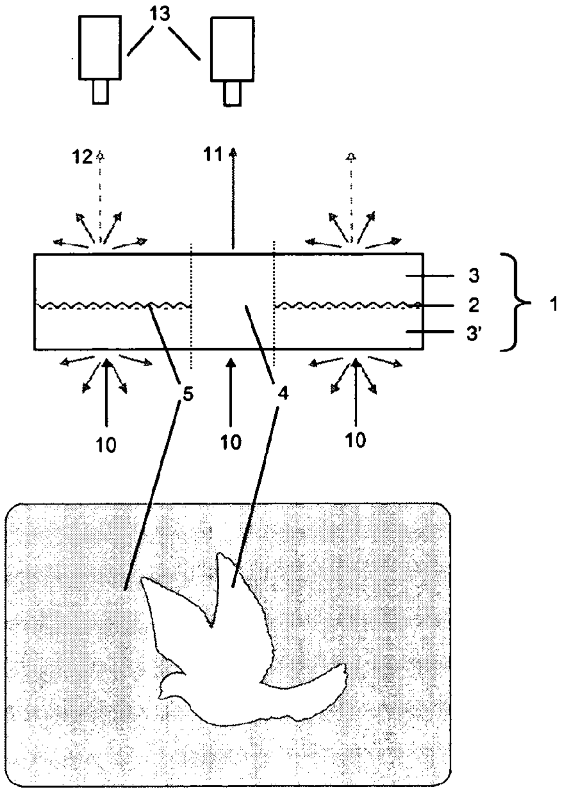
FIG. 2 illustrates a second embodiment of the invention with a test of authenticity of a document in transmission mode.

FIG. 2 illustrates the method of checking the authenticity of the document 1 in transmission mode. The document 1 shown here is identical to the one described in relation to FIG. 1.

By introducing the non woven layer 2 in the laminated body, one also changes the opacity of the document body 1. By making openings 4 in the non woven layer 2, one creates a transmission watermark in the structure of the document 1. This is illustrated in FIG. 2 by the impinging light rays 10 illuminating perpendicularly the rear side of document 1. Due to the difference in opacity in the zones 4 and 5, the light rays 7 and 8 reflected on the front side of the document 1 will have different intensities. It is although possible to distinguish between zone 4 type and zone 5 type. The lower image of FIG. 2 illustrates the picture that should be perceived by the camera 13 as result of an authenticity test in transmission mode.

It has to be noted that this effect (opacity) is not dependent on the relative (vertical) position of the fabric layer 2 inside document 1. In FIG. 2, for the purpose of illustration, the document 1 is considered so thin that the presence of fabric material in zone 5 induces surface relief modifications on both rear and front surfaces of the document 1. This is illustrated on the figure by the gray scattering rays represented at the entrance and the exit of the light on each surface of the document 1. In such configuration, the light rays 7 and 8 detected by the electronic optical means 13 (for example a camera or singular discrete detectors) will depend on a combined effect of the local reflection, scattering, absorption and transmission coefficients, which depend on the presence or the absence of fabric material in the fabric layer 2.

FIGS. 1 and 2 illustrates two possible mode of detection, human or electronic. All kind of optical means can be utilized and even combined. One can use a uniform or singular light source, coherent or incoherent, from a laser beam to the sun light. One can vary the impinging angle of the incident light and/or the observation angle of the detector/observer. The measure can be made in reflection or transmission mode, or even both. These examples are given for illustrative purposes and should not be considered as a limitation in the scope of the present invention.

It is also possible to combine the effects of the reflection watermark with the transmission watermark to form a complete security element using both effects together, for example to form complementary shapes.

Accordingly, such features bring the advantage that at the location of a cut fabric layer, both change in the opacity and surface relief are present, but the change in overall volume/thickness is small if not absent.

Once the change in reflection or transmission is detected, the document can be considered a real document (or not). Of course, it is possible to use not only the presence of a thin layer and/or a cut to detect forgery but also the shape of the thin layer or layers, the shape of the cut or the presence of several cuts with identical or different cuts, complementary or not.

Figure 3:
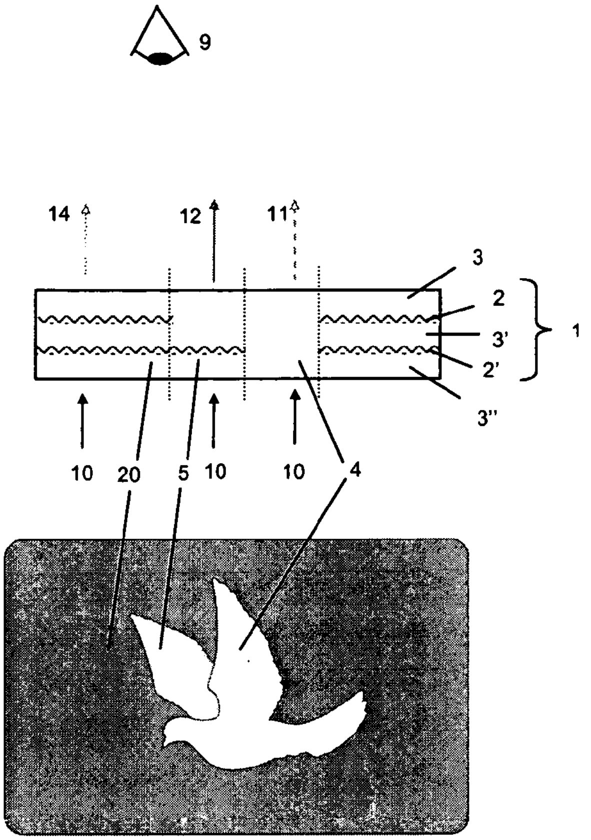
FIG. 3 illustrates a third embodiment of the invention with a test of authenticity of the document containing a plurality of fabric layers.

In another embodiment illustrated in FIG. 3, it is possible to superimpose several fabric layers 2 and 2' with partially complementary apertures/openings in the fabric material thus creating three zones 4, 5 and 20, which simulate a multilevel watermark.

FIG. 3 illustrates an embodiment with a second fabric layer 2' comprising openings, which are partially complementary to the openings of the first fabric layer 2. Both layers are surrounded by thermoplastic layers 3, 3' and 3", for example PU, PVC, PC, PEC, PET-G or adhesive coated PET, where both fabric layers are fully penetrated by at least one of the said thermoplastic layers.

Detection of authenticity of the document can be made by illuminating the surface of the document at least in the zones 4, 5 and 20, then detecting the light emitted by each said zone and finally determining if the detected modulation of the emitted light is located at the vertical of a zone without fabric or a zone with a single layer fabric or a zone with a double layer fabric in the inside of the document. In this case, the document 1 is illuminated from the rear side, and a human observer 9 is testing the authenticity of the document 1 in transmission mode from the front side. The difference of perception resulting from differences of intensity in emerging light rays 11, 12 and 14 is illustrated by the lower image of FIG. 3.

One can also play with the depth of the fabric layers 2 and 2' inside of the document 1. For example, the fabric layer 2 could positioned near (between 50 and 500 micrometers) the front surface, inducing surface relief modifications on the front surface only, whereas the fabric layer 2' could be positioned far away from both surfaces of document 1 such as to induce no change in surface relief. One can imagine an infinite number of variations of such combination of reflective and transmission watermark, all of them having to be considered as covered by the scope of the present invention.

FIG. 4 shows a test of authenticity of a document in reflection mode by a human observer, similar to FIG. 1, but applied to another type of document 18. The document 18 comprising multiple layers with a PU layer (3), a white or translucent layer made from PC (15), and layers 16 and 17 made from transparent PC.

In a similar way, FIG. 5 illustrates how a document 19 comprising two fabric layers 3 and 3' with cut openings can be built from several layers of different thermoplastic materials. FIG. 5 shows an example with PU layers (3, 3', 3"), a white or translucent layer made from PC (15, 15'), and layers (16, 16', 17, 17') made from transparent PC. In this illustration, the authenticity of the document 19 is tested in transmission mode by electronic means, in similar way as in FIG. 3.

The layers 15, 16 and 17 can also be made from PVC, PEC, PET-G or PET.

When forming a laser engravable document at least one of the layers 16 and 17 should be laser engravable.

It is possible to combine the security feature described above with other kinds of security features which could be applied/integrated to the document (micropoints, holograms, . . . ). The document 1 could also used as a support for an electronic element, such a transponder or contact module with an integrated circuit containing security/identity data. The single limitation is that such additional security features should not create an optical interference/impeachment with the critical zone of the watermark according the invention.

Of course, the examples given in the present specification are for an illustrative purpose and should not be considered as limiting the scope of the invention. Also, equivalents are considered within the scope of the present invention.

The invention claimed is:

1. A method of checking the authenticity of at least one of a document, a passport, and a card, with a structure consisting of several co-laminated layers, one of the inside layers being a fabric layer extending at least over a part of said document and having at least first predefined zones with fabric material and second predefined zones without fabric material, wherein said method comprises at least the steps of:

illuminating different spots on a surface of the document detecting the light emitted by each said spots determining if each spot at the surface of the document is located at the vertical of said first or second zones in the inside of the document.

2. A method according to claim 1, wherein the determining step includes the analysis of the light emitted by each of said spots to determine an optical characteristic of the surface of each said spots, the optical characteristic being at least one of reflection, scattering, absorption, and transmission coefficient.

3. A method according to claim 1, wherein the detected light depends on the state of the surface of the illuminated spot being at least one of a surface relief and a surface texture, which depends on the presence or the absence of fabric material at the vertical of the spot in the inside of the at least one of the document, the passport, and the card.

4. A method according to claim 1, wherein the authenticity of the at least one of the document, the passport, and the card is confirmed if the type of zone determined for each spot matches said predefined zones of the fabric layer.

5. A method according to claim 1, wherein the authenticity of the at least one of the document, the passport, and the card is confirmed if an image issued by a recollection of the illuminated spots matches the image corresponding to the predefined zones.

6. A method according to claim 1, wherein the step of light detection is made by human visual control of the reflected and/or transmitted light.

7. A method according to claim 1, wherein a plurality of optical coefficients including at least one of reflection and transmission coefficients are measured at each spot.

8. A method according to claim 1, whereby at least one second fabric layer is also laminated inside of the at least one of the document, the passport, and the card, and wherein the detected light for each spot depends on the distribution of the zone with fabric material in each fabric layer.

9. A document whose authenticity can be checked by a method according to claim 1, with a structure consisting of several co-laminated layers, whereby one of the inside layers is a fabric layer extending at least over a part of said document and having first predefined zones with fabric material and second zones without fabric material.

10. A document according to claim 9, wherein the fabric layer shows a high porosity in order to be fully impregnated by the material of at least one of the co-laminated layers and in order to add substantially no volume and/or thickness to the final body of the laminated document.

11. A document according to claim 9, wherein the fabric layer has a thickness of less than 50 micrometers.

12. A document according to claim 9, wherein said fabric layer is a non-woven layer with a grammage of less than 20 $g/m^2$.

13. A document according to claim 9, wherein the fabric layer is positioned between 50 micrometers and 500 micrometers below the surface of the document.

14. A document according to claim 9, wherein the distribution of zones with and without fabric material forms an image or shape being recognizable or differentiable.

15. A document according to claim 9, wherein the document comprises several fabric layers, positioned between different co-laminated layers.

16. A document according to claim 15, wherein each fabric layer shows a different distribution of the zones with and without fabric material, said distributions being not congruent and/or forming different images or shapes.

* * * * *